Jan. 16, 1968  H. L. WALTER ET AL  3,363,862
VARIABLE CAMBER LONGITUDINAL CONTROL SYSTEM FOR AIRCRAFT
Filed Oct. 20, 1966  4 Sheets-Sheet 1

HAROLD L. WALTER
JEAN A. MALTHANER
INVENTORS

BY Carl R. Brown
ATTORNEY

Jan. 16, 1968  H. L. WALTER ET AL  3,363,862
VARIABLE CAMBER LONGITUDINAL CONTROL SYSTEM FOR AIRCRAFT
Filed Oct. 20, 1966  4 Sheets-Sheet 2

HAROLD L. WALTER
JEAN A. MALTHANER
INVENTORS

BY Carl R. Brown
ATTORNEY

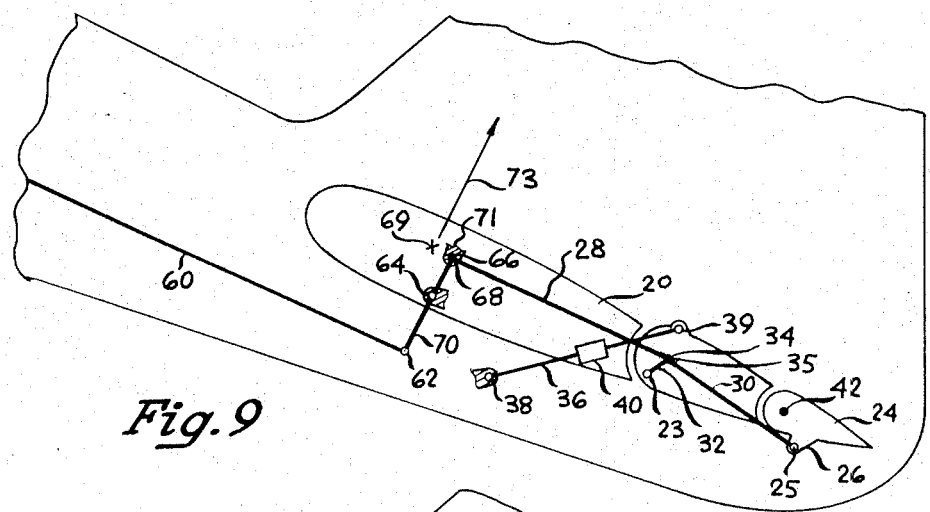
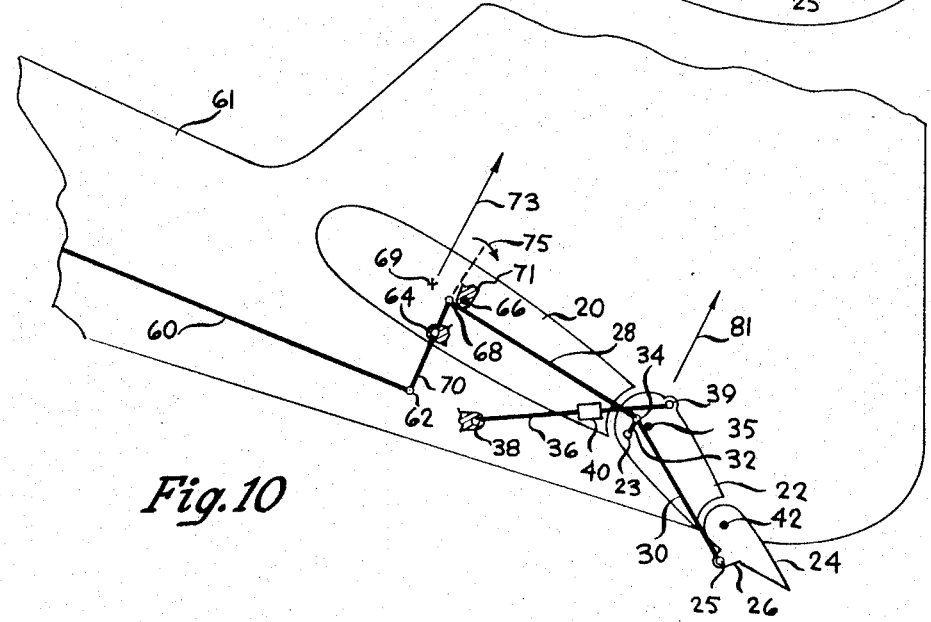
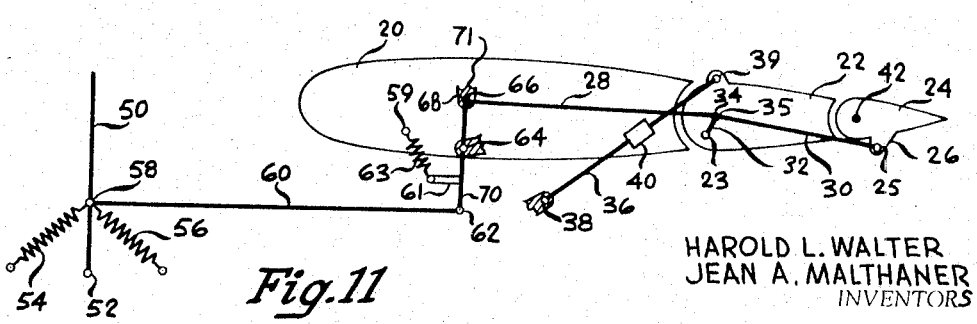

United States Patent Office 3,363,862
Patented Jan. 16, 1968

3,363,862
VARIABLE CAMBER LONGITUDINAL CONTROL SYSTEM FOR AIRCRAFT
Harold Lee Walter and Jean Arthur Malthaner, San Diego, Calif., assignors to General Dynamics Corporation, a corporation of Delaware
Filed Oct. 20, 1966, Ser. No. 588,184
15 Claims. (Cl. 244—82)

This invention concerns a variable camber longitudinal control system for aircraft and more particularly concerns a variable camber longitudinal control system for aircraft in which the control surfaces are joined for pivotal movement to automatically adjust the camber to achieve stable aircraft take-off, flight and landing over wide center of gravity ranges.

In aircraft it is an advantage to improve the pilots control of the aircraft in take-off, flight and landing. This is especially true in low speed aircraft where the widest possible center of gravity range of the aircraft is desired, where the lowest possible take-off and landing speed is desired and where the best inherently stable low speed flight is desired. In conventional low speed aircraft, the length or range of the aircraft center of gravity is a limiting factor in using the aircraft. This center of gravity limitation can seriously limit the loading of the aircraft. If because of loading, the center of gravity is too far forward; then it is difficult for the horizontal tail section to provide a sufficient downward force that is capable of balancing the center of gravity force ahead of the lift. This limitation becomes evident in lifting the nose wheel from the runway during take-off or lifting the aircraft's nose for stall during landing. In either case the most forward range of center of gravity occurs at low speed. If, however, the center of gravity of the aircraft is too far aft because of loading then the stability of the aircraft in flight is adversely affected. If the center of gravity location is positioned aft of the point for stability, the aircraft will then diverge from its trimmed condition.

In flying conventional aircraft, it is often desirable to improve the nose lift off capabilities of the aircraft. However, the means for accomplishing this requires extensive trimming of the horizontal stabilizer. While this will usually increase the nose lift off capability, it has an adverse effect on the aircraft flight thereafter, unless the aircraft is again extensively trimmed. In many instances the later trimming is either not feasible or not desirable. Further, even though the horizontal stabilizer is trimmed sufficiently for lifting the nose at forward center of gravity locations, the aircraft may be seriously out of trim if speed is increased thereby causing a serious pitch-up condition. This can occur immediately after take-off or, for example, during a wave-off from a landing approach. Any condition requiring a significant change in trim is a potential problem area—especially if the condition takes place during a relatively short period of time.

Another disadvantage of having to excessively trim conventional aircraft to allow different center of gravity locations is that after trimming the pilots reaction in flying the aircraft is different. This requires more pilot adaptation since this condition is analogous to "flying a different aircraft."

The aircraft's longitudinal stability is determined by the manner in which the horizontal tail lift changes with angle of attack and airspeed. If the aircraft tends to diverge from its trimmed condition as by pitching up, the angle of attack of the tail is increased causing additional lift. This upward lift behind the center of gravity creates a nose down moment tending to pitch the aircraft nose down to its original position. If the tendency to pitch up remains greater than the tendency to restore, then the aircraft is unstable. For conventional aircraft, the elevator tends to streamline with the relative wind so that the tail restoring tendency is not as great as would be the case if the tail were rigid. There is, in conventional aircraft, a certain degree of stability of the aircraft that exists when the pilot is rigidly holding the controls, such as the control stick, because there is a direct linkage from the control stick to the horizontal stabilizer control surfaces. However, when the pilot releases the stick or controls for any reason, the elevator or the longitudinal control system tends to float with the relative wind and decreases the stability of the aircraft.

It is therefore an object of this invention to provide a new and improved longitudinal control system for aircraft.

It is another object of this invention to provide a new and improved longitudinal control system for aircraft that provides an extended center of gravity range for stabilized flight.

It is another object of this invention to provide a new and improved horizontal control system for aircraft having a wide center of gravity range in which the pilot stick force remains substantially constant.

It is another object of this invention to provide a new and improved horizontal stabilizer control system that provides increased tail lift at low speeds.

It is another object of this invention to provide a new and improved horizontal stabilizer control system for aircraft that provides a wide range of aircraft lift or flight condition without requiring a change in longitudinal trim by the pilot.

It is another object of this invention to provide a new and improved horizontal stabilizer and control surfaces that automatically vary camber in flight to stabilize the aircraft by increasing tail lift in the desired direction to improve the restoring moment provided by the horizontal tail over that of a conventional system.

It is another object of this invention to provide a new and improved longitudinal horizontal control system that improves nose wheel lift-off capability.

It is another object of this invention to provide a new and improved longitudinal control system for high tail aircraft that resists the tendency of such aircraft to pitch-up in stall.

Our invention accomplishes the foregoing objects by employing a longitudinal control system that adjusts its camber either automatically to correct for unstable flight conditions or in response to pilot control for changing the flight path of the aircraft. The horizontal stabilizer is pivotally supported on the aircraft for free and independent rotational movement. The elevator is pivotally supported on the aft edge of the stabilizer with its forward end being connected through a trim linkage to the aircraft structure. The elevator is also capable of rotational movement that is directly dependent upon the rotational movement of the stabilizer and is independent of direct pilot control. The elevator has a tab on its aft end that is directly connected by control linkage to the pilot controls. Thus the entire longitudinal control system is controlled through pilot control of the tab position.

In general the stabilizer being freely rotatable, is positioned by the relative wind or by lift conditions on the entire longitudinal control system around its point of pivotal connection to the aircraft. The pilot in changing the position of the tab relative to the remainder of the longitudinal control surfaces, changes the lift conditions on the control surfaces. The control surfaces then seek a point of equilibrium of the lift conditions around the pivotal connection which usually results in the jointed longitudinal control system becoming curved in a manner that changes its camber. While the lift conditions on the control surfaces equalize in the rotational moments of the stabilizer around its pivotal support, the resultant lift on the aircraft because of the change in camber is increased in the desired direction. This increase in resultant lift either inherently occurs during undesired nose up or nose down conditions or when the pilot moves the control stick to change the flight of the aircraft.

This relatively automatic increase of lift by the change in camber of the longitudinal control system, allows the aircraft center of gravity range to be extended so that loading of the aircraft is not so critical. This is accomplished without excessive or major changes of the trim controls, since the tail's longitudinal control occurs automatically and without pilot control other than movement of the control stick. The longitudinal control system is thus capable of moving the stabilizer and elevator in combination to achieve maximum lift under varying flight conditions. This is accomplished with a small stick force so that it is not necessary for the pilot to trim. Very little force is required to move the tab and little aerodynamic force is transmitted from the tab to the pilot's control stick.

Novel features of construction and operation of the device will be more clearly apparent during the course of the following description, reference being had to the accompanying drawing wherein has been illustrated a preferred form of the device and wherein like reference characters are employed to denote like parts throughout the several figures.

Figure 6:
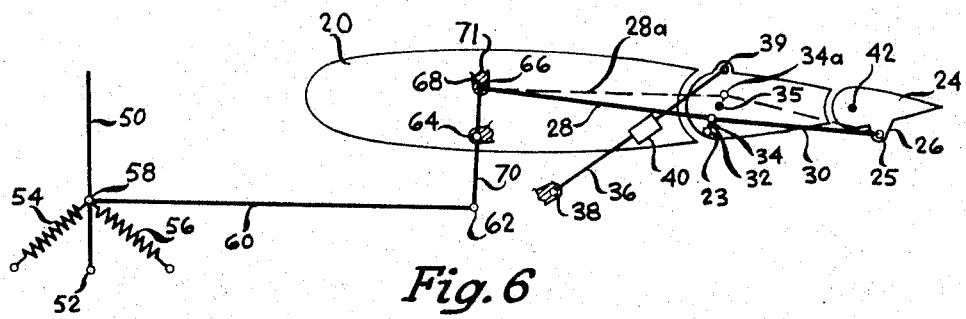
Figure 7:
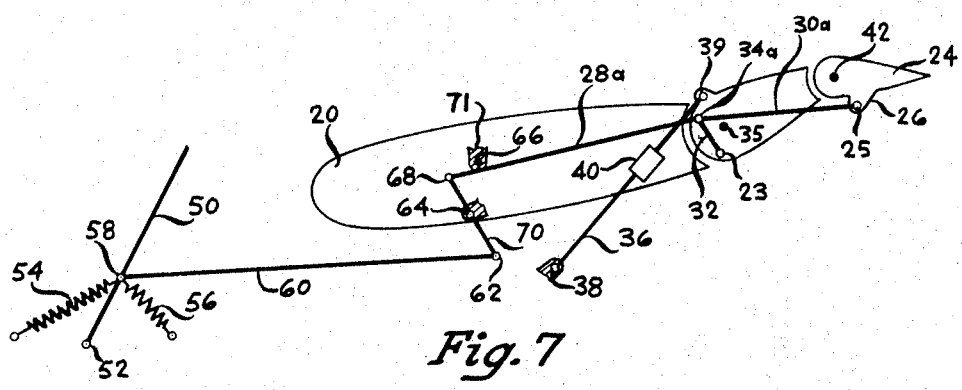
Figure 8:
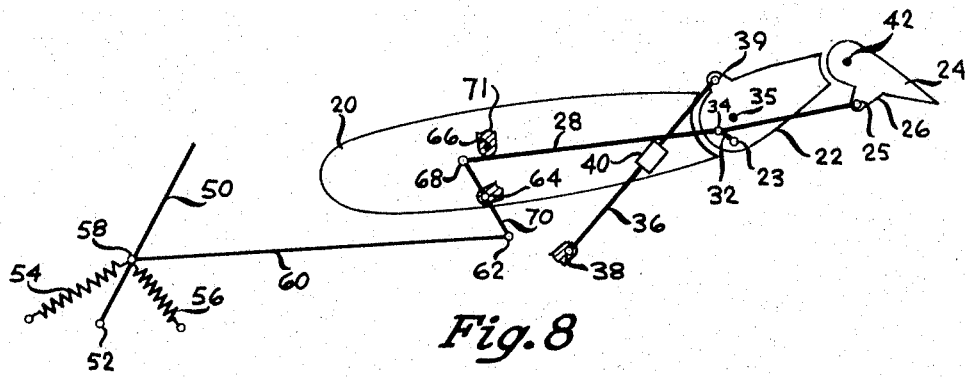

FIGURES 6, 7 and 8 schematically illustrate the pivotally supported longitudinal control system with negative or positive servo control.

FIGURES 9 and 10 schematically show the longitudinal control system of our invention reacting to a nose up condition.

FIGURE 11 is a schematic illustration of the pivotally supported longitudinal control system; with a resilient member for positioning the stabilizer.

Figure 1:
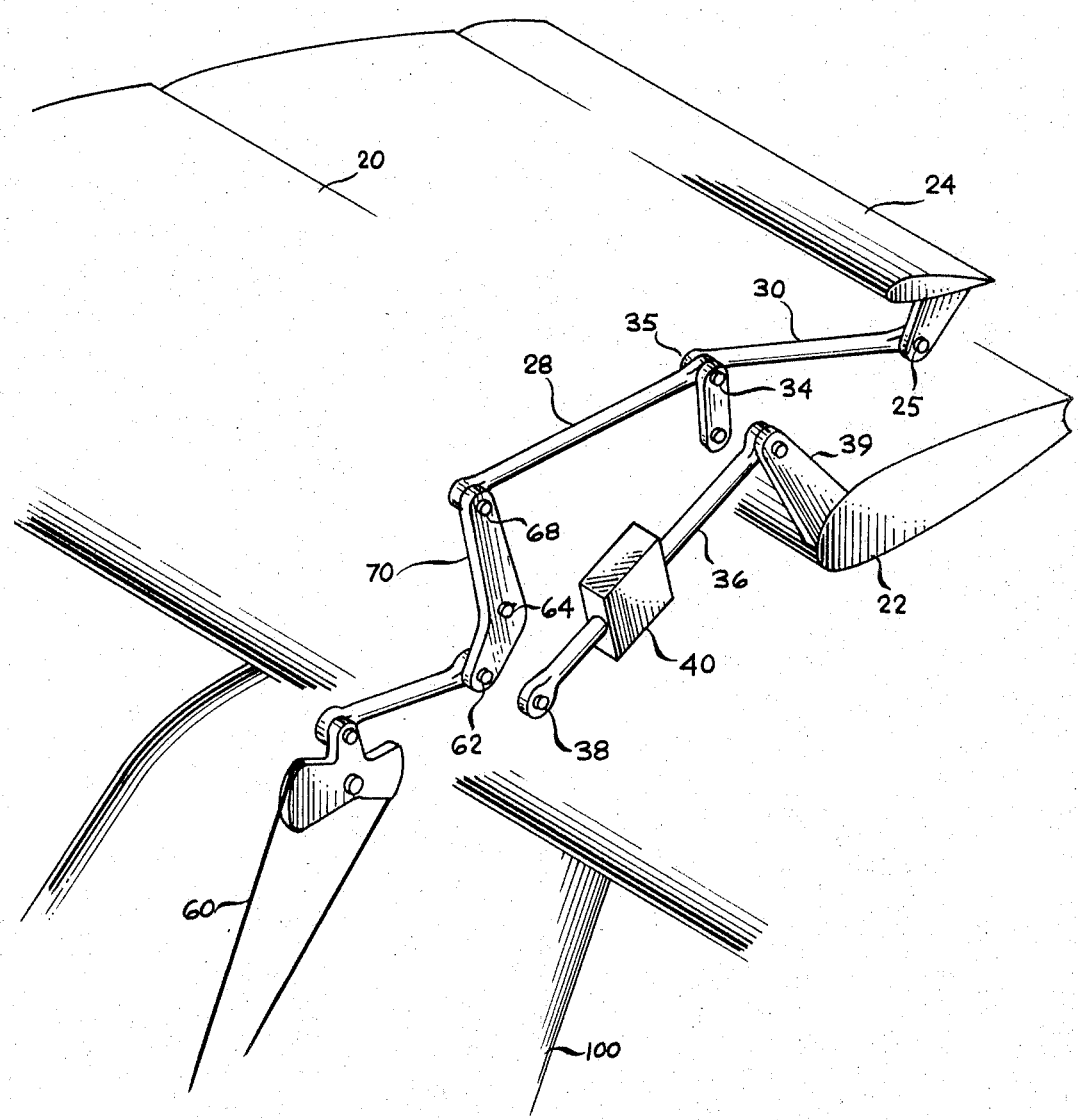
FIGURE 1 is a perspective and schematic view of an aircraft tail employing an embodiment of our invention.

Referring now to FIGURE 1, there is shown a portion of an aircraft tail comprising a raised support 100 for supporting a stabilizer 20, elevator 22 and tab 24. The stabilizer 20 is pivotally supported on the raised support 100 by a pivotal connection (not shown in FIGURE 1 but shown in FIGURE 3 as 66). The elevator 22 is supported on the aft end of the stabilizer 20 by a pivotal connection (not shown in FIGURE 1 but shown in FIGURE 3 as 35) and also by the trim linkage 36 that is secured at one end 39 to the upper surface of the elevator 22 and at its other end 38 to the support structure 100. A trim linkage extension and retraction mechanism 40 is used to trim the elevator in a manner that will be more fully described hereinafter. A tab 24 is pivotally secured to the aft end of the elevator by a pivotal connection (not shown in FIGURE 1 but shown in FIGURE 3 as 42) and its movement is controlled by a linkage that extends from the pilot actuated cables 60 through lever 70 and through connecting linkages 28 and 30.

Figure 2:
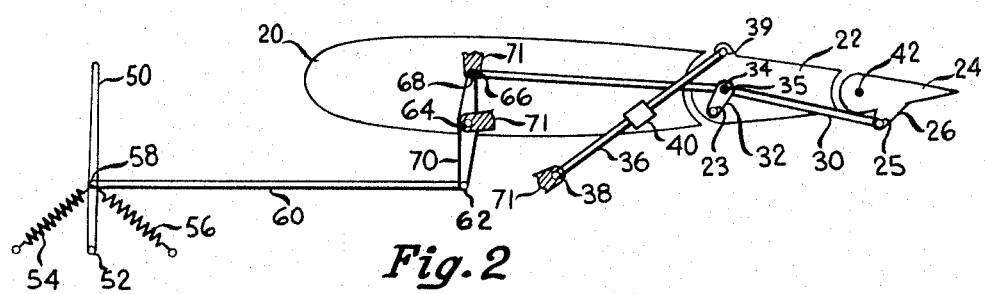
FIGURE 2 shows a pivotally supported stabilizer with pilot controls that utilizes an embodiment of our invention.

For a better understanding of our invention and the operation of the structure reference is made to FIGURE 2, wherein the horizontal stabilizer 20 is in position for horizontal flight. The pilot control stick 50 pivots around fixed point 52, which point is pivotally secured to the aircraft and the stick is shown in position for controlled horizontal flight. Springs 54 and 56 are representive biasing means for opposing stick movement from the position of horizontal flight, and function to give the pilot a resistance feel when moving the stick. The resistance feel is necessary because movement of the tabs, as will be more apparent hereafter, does not require a large amount of force. A linkage 60 extends between a connection at 58 to the control stick 50 and the end of the input crank 70. Input crank 70 is pivotally connected at a point 64 along its length, to the aircraft structure 71 for rotational movement. The horizontal stabilizer 20 is pivotally secured to the aircraft structure 71 at point 66, which in the neutral stick position may also be the location of the other end 68 of crank 70. Linkage 28 connects the end 68 of crank 70 to the end 34 of linkage 30 and also to the end 34 of idler crank 32. The other end of idler crank 32 is pivotally connected to the elevator 22 at point 23. The end 34 of linkages 28 and 30 and idler 32 may, in the neutral position, be at the point of pivotal connection and support 35 of the elevator 22 by a projection (not shown) from the aft end of stabilizer 20. Linkage 30 extends from the ends of linkage 28 and idler crank 32 at 34 to a tab horn 26 that is secured to the tab 24. Tab 24 is pivotally connected at 42 to the end of the elevator 22. A trim linkage 36 connects the upper surface of elevator 22 at 39 to the aircraft structure 71 at point 38.

The alignment between elevator 22 and stabilizer 20 in flight, such as for example in horizontal flight, is established by the trim linkage 36. Linkage 36 may be lengthened or shortened by manipulating a mechanism 40 in the well known manner. Mechanism 40 may for example be a screw adjustment device, hydraulic device or the like. The purpose of linkage 36 is to assure a predetermined and yet selectively variable alignment between the horizontal stabilizer 20 and elevator 22, for reasons that will be more apparent hereinafter.

The horizontal stabilizer 20 pivots around point 66 and is pivotally supported at this point by the aircraft structure 71. The elevator 22 pivots around point 35 or around the point to which it is secured to the end of the horizontal stabilizer 20. Thus the horizontal elevator 22 moves vertically with the end of the stabilizer 20 at point 35. Also when the stabilizer 20 pivots and its trailing edge moves vertically, then linkage 36 forces the elevator 22 to rotate in an opposite clockwise or counterclockwise direction around point 35 to maintain the constant length of the rigid linkage 36. Tab 24 pivots around the point of connection 42 to elevator 22. So when the trailing edge of the elevator 22 moves vertically, the tab 24 also moves vertically. However, the rotational movement of tab 24 around point 42 is determined by linkage 30 and its movement relative to the horizontal stabilizer 20.

As previously stated FIGURE 2 describes the normal positioning of the horizontal stabilizer 20, elevator 22 and tab 24 for horizontal flight. When it is desired to raise the nose of the aircraft, then the flight control stick 50 is pulled back by the pilot in the normal manner. This exerts a force against spring 54 giving the pilot the apparent feel of moving a control surface. Linkage 60 is thus moved aft. This rotates input crank 70 around point 64 causing the end 68 and linkage 28 to move forward. Linkage 30 is pulled forward and pivots idler crank 32 in a counter-clockwise direction, pulls tab horn 26 forward and rotates tab 24 in a clockwise direction around its pivotal support 42. The tab 24 then assumes the position shown in FIGURE 3. When the tab 24 is rotated clockwise relative to the remainder of the horizontal longitudinal control system, then the tab 24 creates an upward lift moment 88 (see FIGURE 5) around the pivot 66. This tab generated upward lift moment lifts the aft section upwardly. As the elevator 22 is moved upwardly relative to the stabilizer 20, the trim linkage 36 rotates the elevator in a counter-clockwise direction changing the camber of the longitudinal control system. Since the horizontal stabilizer is free to rotate around point 66, it rotates a given amount to assume the position shown in FIGURE 4. In the position of FIGURE 4, the horizontal stabilizer has a downward or negative lift moment 84 and the elevator 22 has a downward lift moment 90. With the different distances from the pivot or fulcrum point 66, moment 90 equals moments 84 and 88 and the longitudinal control system assumes the static position of equilibrium of FIGURE 4. In this position the two downward or negative lift moments 84 and 90 combine to move the tail of the aircraft downward or the nose upward.

Thus the movement of stick 50 rearwardly forces a substantially predetermined angular position between elevator 22 and tab 24. This angular relationship establishes the eventual positioning of the freely pivotable horizontal stabilizer 20 and the resultant change in the camber of the entire configuration of the longitudinal control system. The purpose of changing the configuration by changing the camber of the air foil is to obtain greater lift. Thus it is possible to obtain greater lift at lower aircraft speed and increase the flight control of the aircraft at low speeds. The change in camber and increased lift is obtained automatically through movement of the pilot's control stick. The position of the freely movable control surfaces in FIGURE 4 is stable in flight, because the tabs 24 upward lift moment 88, see FIGURE 5, at or about point 66 is equalized by the elevators downward lift movement 90 and the stabilizers downward lift moment 84 around point 66. This allows the downward lift forces 84 and 90 of the entire air foil surface to control the tail of the aircraft.

Figure 3:
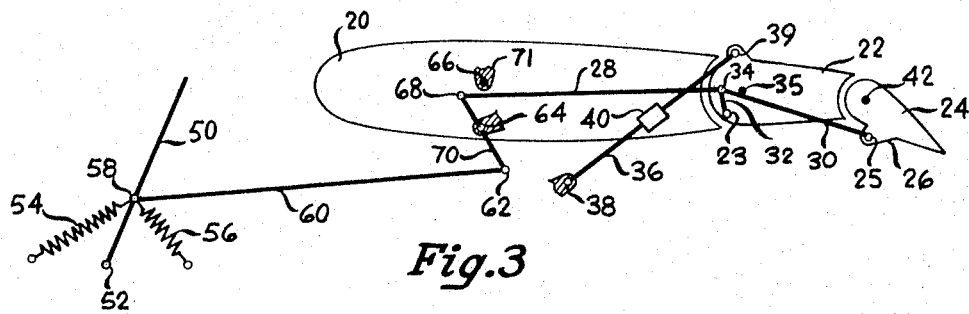
FIGURES 3 and 4 are schematic illustrations of the pivotally supported stabilizer of FIGURE 2 in successive reactions to movement of the pilots control stick.
Figure 4:
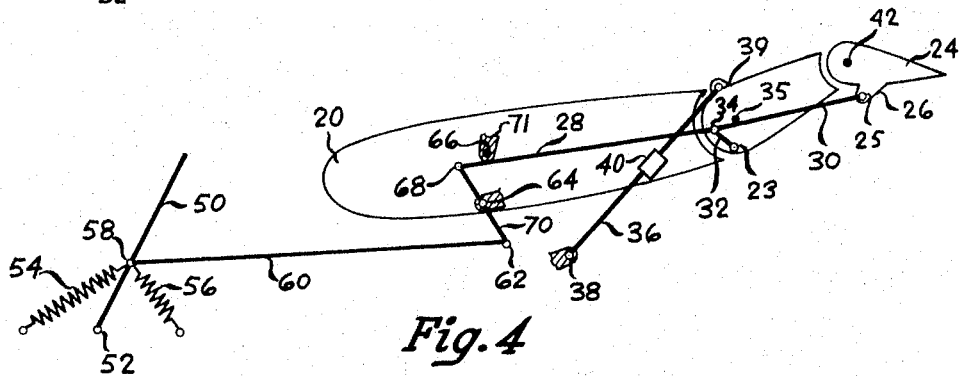
Figure 5:
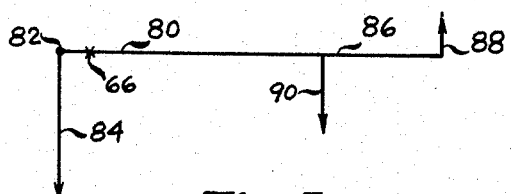
FIGURE 5 is a diagram of the lift moments on the longitudinal control system illustrated in FIGURE 4.

In tht embodiment shown in FIGURES 2 through 4, the end 34 of linkage 28 and 30 and idler crank 32 are at the point 35 of pivotal connection of elevator 22 to the stabilizer 20 in level flight. Shortening or lengthening idler crank 32 to move connection 34 to a position above or below the pivotal connection 35 establishes whether there is servo effect action or anti-servo effect that aids to either stabilize or destabilize the system. In FIGURES 2, 3 and 4 there is no servo effect. FIGURES 6 7 and 8, however, illustrate the air foil with control linkages that will produce a servo effect.

The servo effect is produced by placing the point of connection 34 in a location either above or below the pivotal connection 35. When, as shown in FIGURE 6, the point of connection 34a to idler crank 32 is above connection 35; then the anti-servo effect exists and when the control stick is pulled back to raise the nose of the aircraft, the servo effect is undercompensated. This occurs since the initial movement of tab 24 in response to movement of the stick 50 will be less, because there is less movement of linkage 30a than when points 34a and 35 are aligned as illustrated in FIGURE 2. With the end 34a of idler crank 32 in this location there is less movement of the tab 24, the air foil is slower in assuming the controlled configuration and the force moments 88 and 90 of FIGURE 4 are smaller. On the other hand if the point 34 of the connection between linkages 28 and 30 is below the pivotal point 34 as shown in FIGURES 6 and 8 then movement of the tab section 24 is greater for the nose up control of the aircraft and the reaction to the aircraft to this movement is greater and more rapid reflecting the overcompensated servo effect. Both of these servo effect may be selectively used where desired for given modes of flight.

When the pilot wants to lower the nose of the aircraft, he then moves the pilot control stick 50 forward in the normal manner. This causes tab 24 to be rotated in a counter-clockwise direction and the stabilizer 20, elevator 22 and tab 24 assume positions exactly opposite that previously described in FIGURES 2, 3 and 4. The force moments as shown in FIGURE 4 are reversed to the vertical direction and the surviving lift moment 84 is in the upward direction. This causes the tail section of the aircraft to move upwardly and lower the nose of the aircraft. In addition it should be understood that the amount of movement of stick 50 either in the rearward or forward direction causes a corresponding movement of the tab 24 either in the clockwise or counter-clockwise direction in an amount that causes the vertical lift of the entire tail surface to be varied as previously described in proportion to the degree of stick movement.

The airfoil of the tail structure is trimmed by shortening or lengthening linkage 36 through the mechanical connection 40. This moves projection 39 and rotates the elevator 22 a slight amount relative to the stabilizer 20. This shortening or lengthening of the trim linkage 36 does not change the length of linkages 28 and 30 and their connection 34 holds its positional relationship relative to the point 35 of pivotal movement of the elevator 22. However the relative alignment of the tab 24 to the elevator 22 remains constant because the slight vertical movement of pivot point 42 causes a slight rotation of the tab 24 in the same direction of rotation of elevator 22. This movement does change the camber of the airfoil causing the stabilizer 20 to rotate in a clockwise or counter-clockwise direction to align with elevator 22 and tab 24. Thus this trimming positions the airfoil substantially as shown in FIGURE 2, with the elevator 22 and tab 24 having a slight upward or downward acute angle with the stabilizer 20.

The variable camber longitudinal control system of our invention is particularly advantageous in providing greater inherent stability of aircraft in level flight. Referring to FIGURE 9 the longitudinal control system is shown in a conventional aircraft that, in normal desired horizontal flight, has been pitched nose upward. This pitching nose upward can be caused by any of several reasons such as for example, because of buffeting air currents, because the aircraft has a forward center of gravity and is trimmed to lift the heavy nose and as a result the aircraft then experiences a marked increase in air speed such as at takeoff, etc. The center of lift 69 for stabilizer 20 is forward of the stabilizer's point of pivotal support 66. For example the center of lift 69 may be at the 25 percent chord point while the point of pivoting is at the 32 percent chord point. Thus in FIGURE 9 the lift vector creates a rotational force moment 75 that rotates the stabilizer 20 in the clockwise direction.

The pitch up of the longitudinal control system because of the nose up condition of the aircraft increases the lift of the stabilizer because it changes the stabilizers angle of attack to the wind. In conventional longitudinal control systems, this condition can be expected to cause the elevator to float up or with the relative wind and thus tend to decrease the lift of the stabilizer at a time when an increase in lift is desired to raise the tail or lower the nose of the aircraft. Thus the pilot must exert considerable force on the stick to keep the elevators in the desired position. In our invention the longitudinal control system tends to float against the relative wind and thus to increase the tail lift and thereby make the aircraft more stable over wide ranges of aircraft center of gravity.

When the horizontal stabilizer 20 is rotated clockwise by moment 75, this moves the elevator's forward end downwardly. However a rigid trim linkage 36 resists this downward movement and forces a clockwise rotation of the elevator, see FIGURE 10. The clockwise rotation of the elevator also causes tab 24 to rotate in a clockwise direction an amount that will keep the tab 24 in approximate alignment with the horizontal stabilizer. This increases the camber of the longitudinal control member increasing the overall lift.

To reach a stabilized rotational position of the freely rotatable stabilizer around point 66, the lift moment 81 of elevator 22 and tab 24 around point 66 must equal lift moment 73. When this equilibrium is reached then the longitudinal control system assumes the configuration as illustrated in FIGURE 10 with both lift vectors 73 and 81 being in the upward direction. This considerably increases the lift required to raise the tail of the aircraft and return it to stable horizontal flight. Thus it may be seen that the longitudinal control system of our invention has the capability of moving the stabilizer 20 and elevator 22 in combination and against the relative wind to increase tail lift. The elevator's 22 deflection in the same direction as the stabilizer 20 creates a lift moment that exerts a counter-clockwise rotational moment in the opposite direction that equalizes moment 75 and achieves a stable condition. The restoring tendency caused by the elevator 22 is always greater than the lift moment 73, except when the tab is moved by pilot control.

It can be readily understood that should the aircraft pitch nose downward then the longitudinal control system will react exactly opposite to that previously described and illustrated in FIGURES 9 and 10. The stabilizer 20 will rotate in a counter-clockwise direction as will the elevator 22 and tab 24 and increase the downward or negative lift required to raise the nose of the aircraft. Should the pilot move the control stick to control the aircraft and raise the nose or raise the tail, then the tab 24 will be moved in a direction to accelerate the rotational movement of the stabilizer 20 in the manner previously described and illustrated in FIGURES 2 through 4. This will create an increased sizable rotational moment on the stabilizer 20 with very little loss in lift. Again rotation of the stabilizer 20 deflects the elevator to cancel the moment of the tab and to increase lift significantly.

FIGURE 11 shows a modified embodiment of our invention in which a push-pull spring 63 is connected between arm 61 and the stabilizer 20. Arm 61 is rigidly secured to the input crank 70. This spring functions to allow the pilot to control the position of the freely movable stabilizer 20 and thus avoid having the longitudinal control surfaces wrongly positioned at zero wind conditions or having the stabilizer react to wind conditions other than those induced by flight. The spring 63, of course, complements the movement of the stabilizer 20 that is induced through movement of the pilots control stick 50. At low speeds such as when moving the aircraft on the ground, the spring 63 especially complements the movement of the stabilizer 20. At higher speeds such as when in flight, then the effect of the spring 63 is considerably reduced. The spring 63 also gives the pilot an increased feel of moving the control surfaces at low speeds.

Accordingly our variable camber longitudinal control system allows the aircrafts center of gravity range to be extended so that loading of the vehicle is not so critical. Further this can be accomplished at very low speeds. When our invention is used on aircraft with normal center of gravity variations, then the pilot stick forces have considerably less variation with center of gravity location thereby allowing the pilot to better "know his aircraft." Also where a normal center of gravity range is used, a smaller horizontal tail may be employed with less drag and structural weight.

This longitudinal control system will allow aircraft to be controlled longitudinally without the penalty of the additional weight, complexity reliability decrease, and secondary lock-up system as required in usual powered control systems.

It will be understood that the arrangements and formations of parts as shown and described herein are merely illustrative of the invention principles involved, and that these principles may be otherwise embodied without departing from the spirit of the invention or the scope of the appended claims.

We claim:

1. A longitudinal control system for an aircraft comprising,
    pilot control means for controlling said longitudinal control system,
    horizontal stabilizer means being pivotally supported by said aircraft for controlling the longitudinal flight of said aircraft,
    elevator means being pivotally secured to said stabilizer means,
    tab means being pivotally secured to said elevator means,
    trim linkage means for securing a forward edge of said elevator to said aircraft,
    movable pilot control means,
    and linkage means pivotating said tab means in response to movement of said pilot control means for moving the pivotal position of said stabilizer means.

2. A longitudinal control system as claimed in claim 1 wherein,
    said horizontal stabilizer being supported for free rotational movement at substantially the longitudinal center of gravity of the longitudinal control system.

3. A longitudinal control system as claimed in claim 2 wherein,
    the center of lift of said stabilizer being forward of the point of pivotal support of said stabilizer.

4. A longitudinal control system as claimed in claim 1 wherein,
    said elevator means is freely and pivotally movable independent of said pilot control means.

5. A longitudinal control system as claimed in claim 1 wherein,
    of said stabilizer means, elevator means, and tab means, said pilot control means is solely connected to said tab means.

6. A longitudinal control means as claimed in claim 1 including,
    idler means for movably securing said linkage means to said elevator means.

7. A longitudinal control means as claimed in claim 6 wherein,
    said idler means being capable of substantially restricting movement of said linkage through the axis of the pivotal connection of said elevator means to said horizontal stabilizer means for substantially zero servo effect.

8. A longitudinal control means as claimed in claim 7 wherein,
    said idler means being capable of moving said linkage through points above and below the axis of the pivoted connection of said elevator means to said horizontal stabilizer means for creating servo effect in the movement of said tab.

9. A longitudinal control system as claimed in claim 1 wherein,
    said elevator means being capable of assuming angular positions relative to said stabilizer means,
    said tab means being capable of assuming angular positions relative to said stabilizer means and said elevator means,
    and said angular positions of said elevator means and said tab means resulting in changing the camber of said longitudinal control system.

10. A longitudinal control system as claimed in claim 9 wherein,
    said angular positions of said stabilizer means and said elevator means and said tab means stabilizing at a given configuration and camber in flight,
    and in said given configuration the lift moments of said longitudinal control system equalizing around the point of pivotal support of said horizontal stabilizer means.

11. A longitudinal control system as claimed in claim 10 wherein,
    in said given configuration the sum of said lift moments fore and aft of said point of pivotal support of said horizontal stabilizer means being in the same direction relative to said aircraft.

12. A longitudinal control system as claimed in claim 1 including,
    resilient means being positioned between said linkage means and said stabilizer means for positioning said stabilizer means during substantially zero wind conditions in direct relationship with the position of said pilot control means.

13. A longitudinal control system as claimed in claim 12 wherein,
said resilient means having insufficient force to control the position of said stabilizer means during flight of said aircraft.

14. A longitudinal control system as claimed in claim 1 wherein,
the connection of said trim linkage means to said elevator means is above or below the pivoted connection of said elevator means to said stabilizer means.

15. A longitudinal control system as claimed in claim 1 wherein,
in response to changes in the horizontal flight of said aircraft without changes in the position of said pilot control means, said stabilizer means, elevator means and said tab means assume an angular relationship for changing the camber and increasing the lift of said longitudinal control system in the direction to restore horizontal flight.

References Cited
UNITED STATES PATENTS

| | | | |
|---|---|---|---|
| 2,669,401 | 2/1954 | Bosserman | 244—82 |
| 2,813,689 | 11/1957 | Norton et al. | 244—82 |
| 3,000,595 | 9/1961 | Dorn | 244—82 |

ANDREW H. FARRELL, *Primary Examiner.*

Disclaimer and Dedication

3,363,862.—*Harold Lee Walter* and *Jean Arthur Malthaner*, San Diego, Calif. VARIABLE CAMBER LONGITUDINAL CONTROL SYSTEM FOR AIRCRAFT. Patent dated Jan. 16, 1968. Disclaimer and dedication filed Nov. 1, 1971, by the assignee, *General Dynamics Corporation*.

Hereby enters this disclaimer to claims 1–15 and dedicates said patent to the Public.

[*Official Gazette March 7, 1972.*]